(12) United States Patent
Ishida et al.

(10) Patent No.: US 12,504,525 B2
(45) Date of Patent: Dec. 23, 2025

(54) OBJECT DETECTION DEVICE

(71) Applicant: DENSO CORPORATION, Kariya (JP)

(72) Inventors: Syoya Ishida, Nisshin (JP); Yu Koyama, Nisshin (JP); Tetsuya Aoyama, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 214 days.

(21) Appl. No.: 18/004,642

(22) PCT Filed: Jun. 25, 2021

(86) PCT No.: PCT/JP2021/024162
§ 371 (c)(1),
(2) Date: Jan. 6, 2023

(87) PCT Pub. No.: WO2022/009706
PCT Pub. Date: Jan. 13, 2022

(65) Prior Publication Data
US 2023/0243945 A1    Aug. 3, 2023

(30) Foreign Application Priority Data
Jul. 10, 2020    (JP) .................. 2020-119424

(51) Int. Cl.
*G01S 7/52*    (2006.01)
*G01S 7/534*    (2006.01)

(52) U.S. Cl.
CPC .......... *G01S 7/52006* (2013.01); *G01S 7/534* (2013.01); *G01S 2007/52009* (2013.01)

(58) Field of Classification Search
None
See application file for complete search history.

(56) References Cited

U.S. PATENT DOCUMENTS 4,169,255 A * 9/1979 Hulsman .................. G01S 7/527
367/901
4,176,337 A * 11/1979 Aechter .................. G01S 7/527
73/861.26

(Continued)

FOREIGN PATENT DOCUMENTS

| JP | H104-291188 A | 10/1992 |
| JP | 2001-221849 A | 8/2001 |
| JP | 2007333414 A * | 12/2007 |

OTHER PUBLICATIONS

Long, Zhili, et al. "Constant amplitude control of high-power ultrasonic drive system." 2014 IEEE International Conference on Information and Automation (ICIA). IEEE, 2014. (Year: 2014).*

*Primary Examiner* — Hovhannes Baghdasaryan
*Assistant Examiner* — Jonathan D Armstrong
(74) *Attorney, Agent, or Firm* — Maschoff Brennan

(57) ABSTRACT

An object detection device includes a transceiver configured to transmit/receive an ultrasonic wave; a drive signal generation unit configured to generate a drive signal for driving the transceiver; a transmitter circuit configured to cause the transceiver to transmit a probe wave, which is an ultrasonic wave, by driving the transceiver based on the drive signal; and a receiver circuit configured to generate a reception signal corresponding to a reception result of the ultrasonic wave of the transceiver, wherein the drive signal generation unit is configured to generate the drive signal so that frequency of the probe wave changes over time. The device further includes: a voltage measurement unit configured to measure a voltage signal generated in the transceiver while the transceiver transmits the probe wave with frequency changing over time; and a state determination unit configured to make a state determination regarding the transceiver based on the voltage signal.

12 Claims, 5 Drawing Sheets

(56) References Cited

U.S. PATENT DOCUMENTS

| | | | |
|---|---|---|---|
| 4,412,147 A | 10/1983 | Nagura et al. | |
| 5,804,008 A * | 9/1998 | Kennard | B29C 66/8242 |
| | | | 156/73.2 |
| 7,385,487 B2 * | 6/2008 | Simonazzi | G01S 15/931 |
| | | | 367/99 |
| 8,699,299 B2 * | 4/2014 | Horsky | B06B 1/0253 |
| | | | 367/95 |
| 10,967,298 B2 * | 4/2021 | Lipkens | B01D 21/00 |
| 11,194,028 B2 * | 12/2021 | Kutej | B06B 1/0215 |
| 11,269,067 B2 * | 3/2022 | Kutej | G01S 7/52004 |
| 2004/0135992 A1 * | 7/2004 | Munro | G01S 7/483 |
| | | | 356/4.01 |
| 2009/0207006 A1 * | 8/2009 | Richter | G01S 15/931 |
| | | | 367/13 |
| 2011/0261652 A1 * | 10/2011 | Horsky | B06B 1/0253 |
| | | | 73/579 |
| 2017/0115382 A1 * | 4/2017 | Koudar | G01S 7/524 |
| 2018/0207551 A1 * | 7/2018 | Lipkens | B01D 17/04 |
| 2019/0079173 A1 | 3/2019 | Kutej et al. | |
| 2019/0079174 A1 * | 3/2019 | Kutej | G01H 13/00 |
| 2019/0337015 A1 * | 11/2019 | Nakao | B06B 1/0215 |
| 2019/0339370 A1 | 11/2019 | Watanabe et al. | |

* cited by examiner

OBJECT DETECTION DEVICE

CROSS REFERENCE TO RELATED APPLICATIONS

The present application is based on Japanese Patent Application No. 2020-119424 filed Jul. 10, 2020, the description of which is incorporated herein by reference.

TECHNICAL FIELD

The present disclosure relates to object detection devices.

BACKGROUND ART

Ultrasonic sensors mounted to vehicle bumpers, etc. use microphones as ultrasonic transceivers. If snow or mud adheres to the surfaces of such microphones, the microphone characteristics may change and the detection performance of the ultrasonic sensors may be deteriorated. Accordingly, in order to suppress performance deterioration of parking assistance systems, etc. which use ultrasonic sensors, the states of the microphones are required to be self-diagnosed.

In this regard, the ultrasonic sonar described in PTL 1 transmits ultrasonic waves with the transmission frequency deviated from the reverberation frequency, and determines abnormality of the transducer based on the reverberation time and the frequency analysis results, making use of the reverberation time that changes with the change in state of the transducer.

CITATION LIST

Patent Literature

PTL 1: JP 2001-221849 A

SUMMARY OF THE INVENTION

However, the effects of the measurement circuit, etc. may be mixed in such reverberation frequency measurement results, and therefore, the microphone state only cannot be determined using the method described in PTL 1.

In light of the points set forth above, the present disclosure aims to provide an object detection device capable of determining the state of a transceiver.

According to an aspect of the present disclosure, an object detection device includes a transceiver configured to transmit/receive an ultrasonic wave; a drive signal generation unit configured to generate a drive signal for driving the transceiver; a transmitter circuit configured to cause the transceiver to transmit a probe wave, which is an ultrasonic wave, by driving the transceiver based on the drive signal; and a receiver circuit configured to generate a reception signal corresponding to a reception result of the ultrasonic wave of the transceiver, wherein the drive signal generation unit is configured to the drive signal so that frequency of the probe wave changes over time. The device further includes: a voltage measurement unit configured to measure a voltage signal generated in the transceiver while the transceiver transmits the probe wave with frequency changing over time; and a state determination unit configured to make a state determination regarding the transceiver based on the voltage signal. The transmitter circuit is configured to control current generated according to the drive signal so as to have a constant electrical power, and supply the current to the transceiver; and the state determination unit is configured to make the state determination based on an amplitude signal extracted from the voltage signal.

The present inventors have found that, in an ultrasonic sensor that transmits probe waves containing a frequency modulation signal from a transceiver formed of a microphone or the like, the voltage signal generated in the transceiver during probe wave transmission changes due to adhesion of snow or the like. Based on the change in voltage signal, the state of the transceiver can be determined.

The bracketed reference signs given to the components and the like indicate correspondence of these components and the like with specific components and the like described in the embodiments provided below.

DESCRIPTION OF THE EMBODIMENTS

With reference to the drawings, some embodiments of the present disclosure will be described. It should be noted that, between the embodiments described below, an identical reference sign is given to parts identical or equivalent to each other.

First Embodiment

Figure 1:
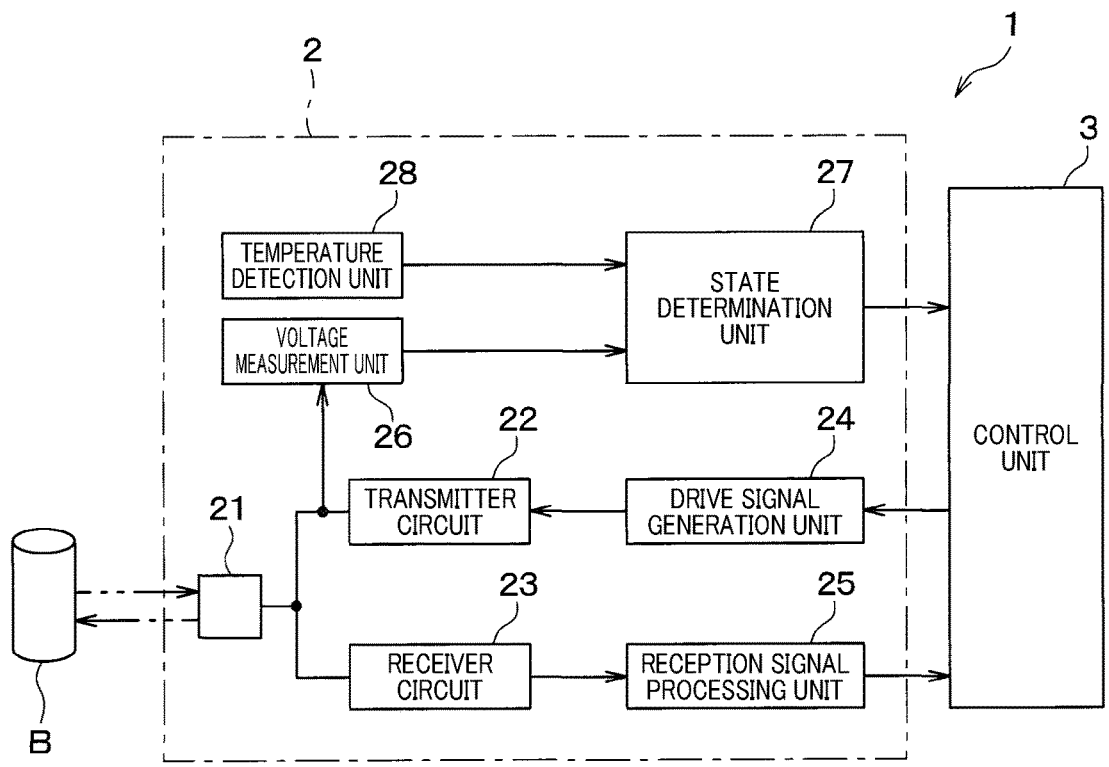
FIG. 1 is a block diagram illustrating a configuration of an object detection device according to a first embodiment.

A first embodiment will be described. FIG. 1 shows an object detection device 1 according to the present embodiment which is mounted to a vehicle, not shown, and is configured to detect an object B which is present around the vehicle. The vehicle to which the object detection device 1 is mounted is referred to as "own vehicle" hereinafter. The vehicle not shown may be, for example, an automobile.

The object detection device 1 includes an ultrasonic sensor 2 and a control unit 3 that controls the operation of the ultrasonic sensor 2. The ultrasonic sensor 2 is configured to detect the object B by transmitting probe waves, which are ultrasonic waves, and receiving reflected waves of the probe waves from the object B.

The ultrasonic sensor 2 includes a transducer 21, a transmitter circuit 22, a receiver circuit 23, a drive signal generation unit 24, a reception signal processing unit 25, a voltage measurement unit 26, a state determination unit 27, and a temperature detection unit 28.

The transducer 21 functions as a transmitter that externally transmits probe waves and as a receiver that receives reflected waves, and is electrically connected to the transmitter circuit 22 and the receiver circuit 23. In other words, the ultrasonic sensor 2 has a so-called transceiver integrated configuration.

Specifically, the transducer 21 is configured as an ultrasonic microphone with a built-in electrical-mechanical energy conversion element such as a piezoelectric element. The transducer 21 is disposed at a position on the outer surface of the own vehicle so that it can externally transmit probe waves and receive reflected waves from outside the own vehicle.

The transmitter circuit 22 is provided so as to cause the transducer 21 to transmit probe waves by driving the transducer 21 based on an inputted drive signal. Specifically, the transmitter circuit 22 includes a digital/analog conversion circuit, or the like. More specifically, the transmitter circuit 22 is configured to generate an element input signal by performing signal processing, such as digital/analog conversion, for the drive signal outputted from the drive signal generation unit 24. The element input signal is an AC voltage signal for driving the transducer 21. The transmitter circuit 22 is configured to cause the transducer 21 to generate probe waves by applying the generated element input signal to the transducer 21 and exciting the electrical-mechanical energy conversion element of the transducer 21.

The receiver circuit 23 is provided so as to generate a reception signal corresponding to the reception results for the ultrasonic waves received by the transducer 21 and to output the generated signal to the reception signal processing unit 25. Specifically, the receiver circuit 23 includes an amplification circuit, an analog/digital conversion circuit, and the like. More specifically, the receiver circuit 23 is configured to generate a reception signal that contains information related to the amplitude and frequency of the received waves by performing signal processing such as amplification and analog/digital conversion for the element output signal outputted from the transducer 21. The element output signal is an AC voltage signal generated by the electrical-mechanical energy conversion element provided to the transducer 21 due to reception of ultrasonic waves.

The drive signal generation unit 24 is provided so as to generate a drive signal and output the generated signal to the transmitter circuit 22. The drive signal is a signal that drives the transducer 21 to transmit probe waves therefrom.

The drive signal generation unit 24 generates a drive signal so that the frequency of the probe waves changes over time. Specifically, the drive signal generation unit 24 generates a drive signal so that the frequency of the probe waves is swept in the frequency modulation range that includes resonant frequency of the transducer 21. As will be described later, the frequency modulation range is changed according to the signal from the state determination unit 27.

The drive signal includes, for example, an up-chirp or a down-chirp. The up-chirp is a frequency modulation state in which the frequency monotonically increases over time. The down-chirp is a frequency modulation state in which the frequency monotonically decreases over time. By making the chirp signal a linear chirp signal in which time and frequency are proportional, internal calculations are simplified and the cost for ASIC to which the drive signal generation unit 24 or the like is mounted can be reduced. ASIC stands for application specific integrated circuit.

The reception signal processing unit 25 performs processing such as FFT for a reception signal to generate a signal corresponding to the amplitude of the received waves and a signal corresponding to the frequency of the received waves. FFT stands for fast Fourier transform. The reception signal processing unit 25 is provided so as to output the generated signal to the control unit 3.

The voltage measurement unit 26, the state determination unit 27, and the temperature detection unit 28 are provided to detect the state of the transducer 21. The voltage measurement unit 26 measures a voltage signal generated in the transducer 21 while the transducer 21 transmits a frequency modulation signal whose frequency changes over time. The voltage measurement unit 26 is provided so as to output the measurement results for the voltage signal to the state determination unit 27.

The state determination unit 27 makes a state determination for the transducer 21 based on the measurement results for the voltage signal, which have been inputted from the voltage measurement unit 26. The state determination unit 27 is provided so as to output determination results to the control unit 3. The temperature detection unit 28 detects the environmental temperature of the ultrasonic sensor 2. The temperature detection unit 28 is provided so as to output a signal corresponding to the detected environmental signal to the state determination unit 27. Using the inputted signal from the temperature detection unit 28, the state determination unit 27 makes a state determination for the transducer 21. The drive signal generation unit 24, the reception signal processing unit 25, the voltage measurement unit 26, and the state determination unit 27 are configured, for example, as a DSP in which functions of generating the drive signal, processing the reception signal, measuring the voltage signal, determining the state, and the like are programed. DSP stands for digital signal processor.

The control unit 3 is connected to the ultrasonic sensor 2 via an on-vehicle communication line to enable communicate with the ultrasonic sensor 2, so that transmission/reception operation of the ultrasonic sensor 2 can be controlled.

The control unit 3 is provides as a so-called sonar ECU and includes an on-vehicle microcomputer that includes CPU, ROM, RAM, nonvolatile rewritable memory, and the like, not shown. ECU stands for electronic control unit. The nonvolatile rewritable memory may, for example, be EEPROM, flash ROM, or the like. EEPROM stands for electronically erasable and programmable read only memory. ROM, RAM, etc. are non-transitory tangible recording medium.

The control unit 3 issues a transmission instruction to the drive signal generation unit 24, performs object detection based on the signal inputted from the reception signal processing unit 25, and performs avoidance control or braking control according to the determination results. Also, the control unit 3 performs processing according to the state determination results for the transducer 21 inputted from the state determination unit 27.

Figure 2:
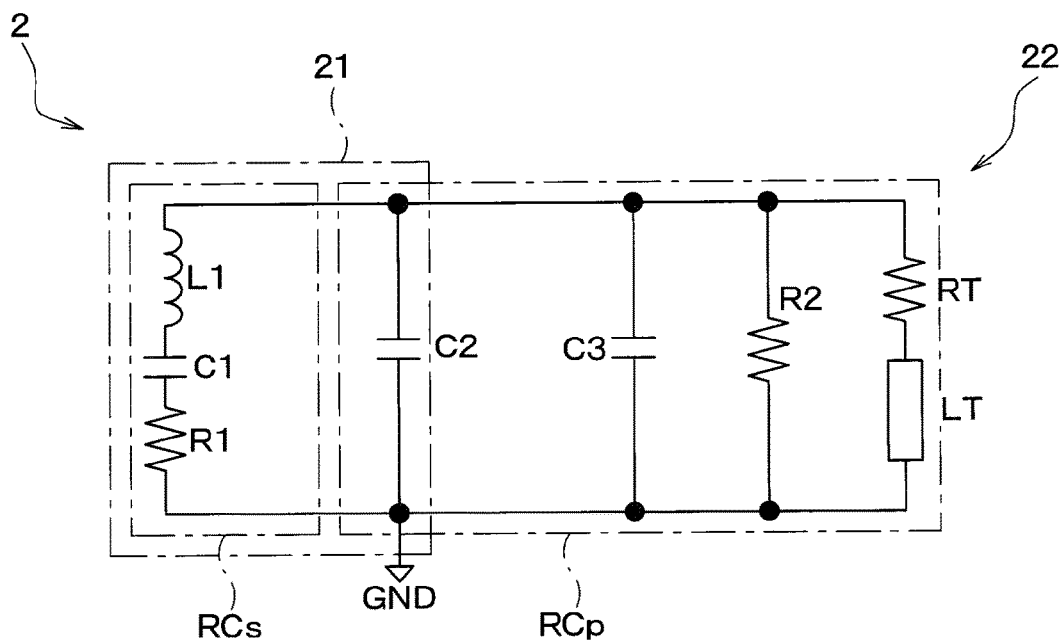
FIG. 2 is a schematic circuit diagram illustrating a configuration of an equivalent circuit in part of the transceiver shown in FIG. 1.

FIG. 2 shows a secondary part, i.e., a connecting part to the transducer 21, in the transmitter circuit 22 and the receiver circuit 23, together with an equivalent circuit of the transducer 21. In FIG. 2, a resistance RT is a DC resistance of a secondary winding in a transformer provided to the transmitter circuit 22 and the receiver circuit 23. An inductance LT corresponds to the secondary winding in the transformer of a booster circuit that generates an AC voltage signal according to the drive signal inputted from the drive signal generation unit 24 and supplies the generated signal to the transducer 21. A primary part in the transmitter circuit 22 and the receiver circuit 23, including a primary winding in the transformer, is omitted from illustration and explanation.

A capacitance C1, an inductance L1, and a resistance R1 are shown as an equivalent circuit representing mechanical vibration in the transducer 21. A serial connection of the capacitance C1, the inductance L1, and the resistance R1 forms a series resonant circuit RCs. A capacitance C2, which is connected parallel to the series resonant circuit RCs in the equivalent circuit, is a capacitance component in the piezoelectric element, which is defined by the inter-electrode distance, electrode area, piezoelectric dielectric constant, and the like of the piezoelectric element.

A parallel resonant circuit RCp is formed by the secondary winding in the transformer provided to the transmitter circuit 22 and the receiver circuit, the capacitance C2 in the transducer 21, a capacitor C3, and a resistance R2. The capacitor C3 is connected parallel to the transducer 21 in order to control resonant frequency in the parallel resonant circuit RCp. The resistance R2 is connected parallel to the transducer 21 and the capacitor C3 in order to control the reverberation time and amplification factor.

Such a circuit usually provides an amplitude waveform of the inter-terminal voltage of the transducer 21, showing characteristics of the transducer 21 and characteristics of other elements forming the circuit shown in FIG. 2. In this regard, the effects of other elements can be reduced by controlling the current or voltage supplied from the primary winding of the transformer such that the electrical power outputted from the inductance LT will be constant or substantially constant. Thus, a waveform related to the characteristics of the transducer 21 is shown in the voltage signal of the transducer 21.

In the state in which the electrical power is controlled, the voltage measurement unit 26 measures an inter-terminal voltage V of the transducer 21 as a voltage signal of the transducer 21. The voltage measurement unit 26 measures, for example, the voltage across the capacitance C2 as an inter-terminal voltage V.

Figure 3:
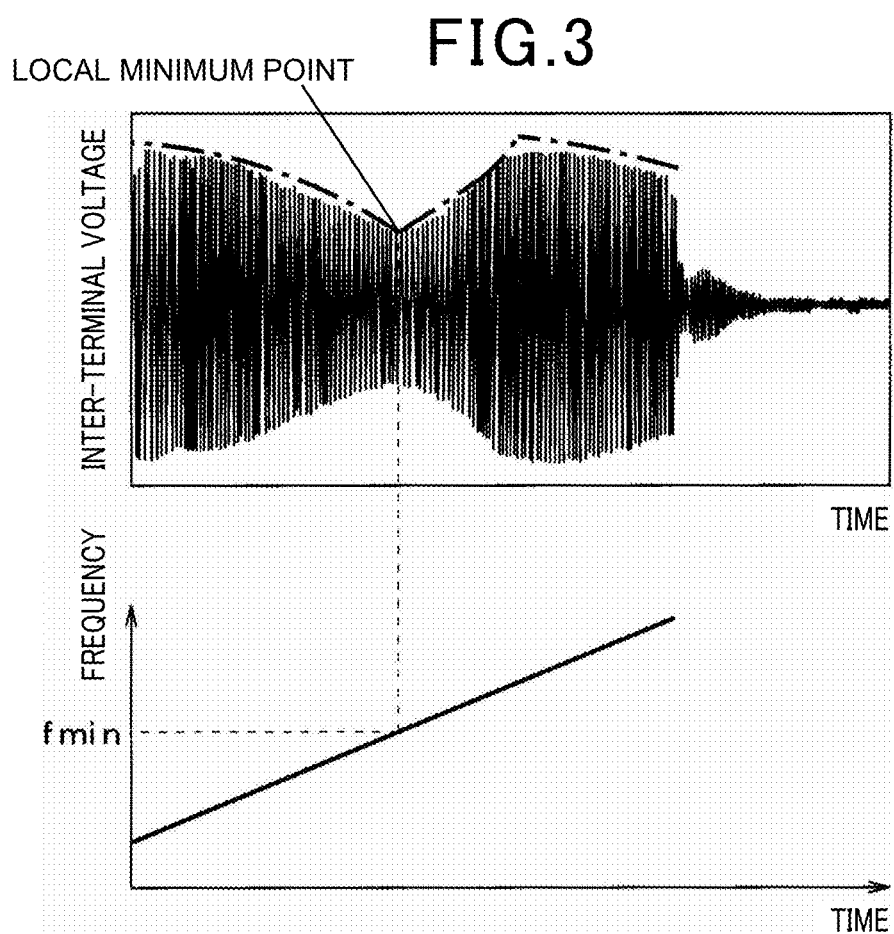
FIG. 3 is a diagram illustrating measurement results of the inter-terminal voltage of a transducer.

FIG. 3 shows an example of measurement results for the inter-terminal voltage V when an ultrasonic signal including an up-chirp is transmitted. Thus, the amplitude of the inter-terminal voltage V increases or decreases due to the drive frequency being swept. The voltage measurement unit 26 excludes, from the waveform of the measured inter-terminal voltage V, phase and frequency information using envelope detection or the like, extracts only the amplitude therefrom, and outputs the extracted amplitude to the state determination unit 27.

If an amplitude signal is extracted in this way for use in state determination for the transducer 21, the sampling rate required by the analog/digital converter forming the voltage measurement unit 26 becomes low. Also, downsampling can be performed after analog/digital conversion. This makes it possible to perform processing with an inexpensive ASIC.

The dash-dot line in FIG. 3 is an envelope curve of the inter-terminal voltage V and indicates the extracted amplitude signal. This amplitude signal changes with the change in state of the transducer 21.

When the state of the transducer 21 is normal, the amplitude signal of the inter-terminal voltage V (hereinafter also referred to simply as amplitude signal) takes a minimum value at a time when the drive frequency of the transducer 21 matches the resonant frequency. For example, when a frequency modulation range is set so as to satisfy fc=f0, a relation fmin=fc is established, where fc represents the center frequency of the modulation range, fmin represents the frequency when the amplitude signal takes a minimum value, and f0 represents the resonant frequency when the transducer 21 is normal. When matching the center frequency fc to the resonant frequency f0 in this way, a pre-examined value or design value is used as a value of the resonant frequency f0.

If abnormality occurs, such as deterioration in detection performance of the ultrasonic sensor due to adhesion of snow or mud to the transducer 21, there is no local minimum point in the amplitude signal. Alternatively, the resonant frequency becomes different from the design value, and the amplitude signal takes a minimum value at a time different from the time mentioned above. Alternatively, the minimum value of the amplitude signal changes. Alternatively, the local minimum point changes due to the change in Q value of the transducer 21. The state determination unit 27 determines the state of the transducer 21 based on the information related to the local minimum point of such an amplitude signal.

The resonant frequency of the transducer 21 and the minimum value of the amplitude signal also change with the change in environmental temperature. The state determination unit 27 corrects the reference value related to the frequency, etc. used for the state determination for the transducer 21, based on the signal inputted from the temperature detection unit 28. Such temperature compensation can improve the accuracy of the state determination.

Operation of the object detection device 1 will be described. Herein, a description will be given of the case where the state of the transducer 21 is determined by setting a frequency modulation range so that fc=f0, and comparing the probe wave frequency fmin corresponding to the local minimum point of the amplitude signal, with the center frequency fc of the modulation range as a reference frequency. The object detection device 1 determines the state of the transducer 21 through the processing shown in FIG. 4.

First, at step S101, the object detection device 1 executes object detection processing using transmission/reception of probe waves. Specifically, the object detection device 1 transmits probe waves having a predetermined frequency modulation state, while receiving reflected waves from an object, to calculate a distance to the object B from the transducer 21 based on the signal corresponding to the amplitude and frequency of the reflected waves generated from the reception signal.

In parallel with the probe wave transmission at step S101, the voltage measurement unit 26 measures an inter-terminal voltage V of the transducer 21, and the temperature detection unit 28 detects the environmental temperature. At the subsequent step S102, the voltage measurement unit 26 extracts an amplitude signal from the waveform of the inter-terminal voltage V and outputs the extracted signal to the state determination unit 27.

Subsequently, at step S103, the state determination unit 27 determines whether there is a minimum value in the amplitude signal inputted from the voltage measurement unit 26. If it is determined, at step S103, that there is no minimum value, control proceeds to step S104 at which the state determination unit 27 turns on an abnormality flag indicating the occurrence of abnormality in the transducer 21. The abnormality flag is used for coping with the abnormality of the transducer 21, that is, the state determination unit 27 outputs abnormality flag information to the control unit 3. If there is no minimum value in the amplitude signal, there is also a probability that the parallel resonant circuit RCp is in failure, and therefore, at step S104, the state determination unit 27 may turn on the abnormality flag indicating the occurrence of abnormality in any one of the transducer 21, the transmitter circuit 22, and the receiver circuit 23.

If there is no minimum value in the amplitude signal, there is a probability that the resonant frequency of the transducer 21 is out of the frequency range of probe waves. In this case, the object detection device 1 changes the frequency modulation range of probe waves and re-transmits probe waves to search for a resonant frequency, i.e., a frequency corresponding to the local minimum point of the amplitude signal.

Specifically, at the subsequent step S105, the state determination unit 27 transmits a signal to the drive signal generation unit 24 to instruct change of the frequency modulation range, in response to which the drive signal generation unit 24 changes the frequency modulation range and generates a drive signal. At step S105, the frequency modulation range of probe waves is expanded. Alternatively, the frequency modulation range is shifted to a high frequency side or a low frequency side. Alternatively, both of expansion and shifting of the frequency modulation range are performed. After that, control returns to step S101. Thus, probe waves are transmitted in the changed frequency modulation range.

If it is determined, at step S103, that there is a minimum value, control proceeds to step S106. At step S106, the state determination unit 27 determines whether the difference between the center frequency fc and the probe wave frequency fmin when the amplitude signal takes a minimum value is less than a predetermined threshold. If the frequency difference is determined to be less than the threshold, the object detection device 1 terminates the processing.

At step S106, if it is determined that the frequency difference is not less than the threshold, control proceeds to step S107 at which the state determination unit 27 turns on the abnormality flag of the transducer 21. Then, at the subsequent step S108, the state determination unit 27 instructs the drive signal generation unit 24 to change the frequency modulation range so that fc=fmin. After that, control returns to step S101.

Thus, the frequency modulation range of probe waves is changed based on the probe wave frequency corresponding to the local minimum point of the amplitude signal. In other words, if the difference between the center frequency fc and the frequency fmin is large, it is determined that abnormality has occurred in the transducer 21. Then, the frequency modulation range is changed so that the value of the center frequency fc will have the value of the frequency fmin, i.e., the value of the actual resonant frequency that is different from the design value of the transducer 21.

The processing described above can achieve a state in which there is a minimum value in the amplitude signal and the difference between the frequency fmin and the center frequency fc is small. After that, the object detection device 1 repeatedly executes the processing shown in FIG. 5 to determine the state of the transducer 21 and set a drive frequency according to the state of the transducer 21.

Figure 4:
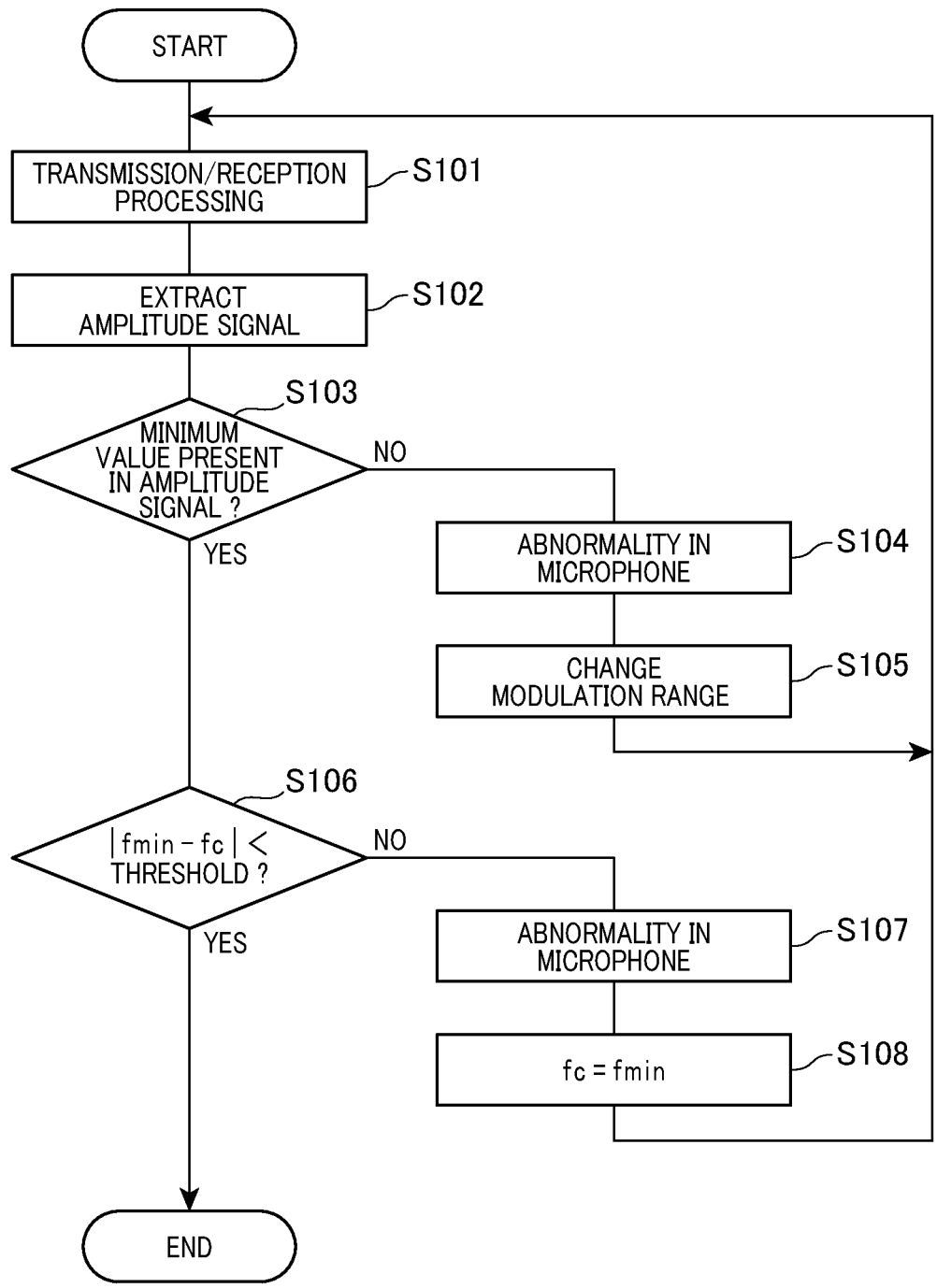
FIG. 4 is a flowchart illustrating state determination processing initially executed.

At steps S201 to S205, the object detection device 1 transmits/receives probe waves and measures the voltage of the transducer 21 as in steps S101 to S105 of the processing shown in FIG. 4 and, if there is no minimum value in the amplitude signal, changes the frequency modulation range to re-transmit probe waves. If there is a minimum value in the amplitude signal, control proceeds to step S206 to compare the frequency difference with the threshold as in step S106 and, if the frequency difference is determined to be less than the threshold, the object detection device 1 terminates the processing.

If it is determined, at step S206, that the frequency difference is not less than the threshold, control proceeds to step S207. At step S207, taking the center frequency of the modulation range in the normal state to be fc0, the state determination unit 27 determines whether the difference between the frequency fmin and the center frequency fc0 in the normal state is less than a predetermined threshold. The center frequency fc0 is taken to be, for example, a resonant frequency f0 when the transducer 21 is in the normal state.

If the frequency difference is determined to be less than the threshold at step S207, control proceeds to step S208 at which the state determination unit 27 instructs the drive signal generation unit 24 to change the frequency modulation range so that fc=fc0. Then, at the subsequent step S209, the state determination unit 27 turns on a normality flag indicating the transducer 21 being normal and terminates the processing.

If the frequency difference is determined to be not less than the threshold at step S207, control proceeds to step S210 at which the state determination unit 27 instructs the drive signal generation unit 24 to change the frequency modulation range so that fc=fmin. Then, at the subsequent step S211, the state determination unit 27 turns on the abnormality flag of the transducer 21 and terminates the processing.

As described above, in the present embodiment, the state of the transducer 21 is determined based on the inter-terminal voltage V, making use of the fact that the waveform of the inter-terminal voltage V during transmission of probe waves including the frequency modulation signal changes depending on the state of the transducer 21. As described above, the effects of the characteristics of the transmitter circuit 22 and the receiver circuit 23 on the inter-terminal voltage V can be reduced and, with this reduction, the state of the transducer 21 can be determined with high accuracy.

Furthermore, if there is no minimum value in the amplitude signal within the modulation range of the probe wave frequency, the object detection device 1 of the present embodiment sweeps frequency by expanding or shifting the modulation range and searches for a local minimum point of the amplitude signal. Then, the modulation range is changed so that the probe wave frequency when the amplitude signal takes a minimum value will be the center frequency, thereby preventing the object detection performance from being deteriorated due to the change in characteristics of the transducer 21.

Also, a signal such as a chirp signal that changes its frequency over time is transmitted as probe waves, so that the inter-terminal voltage V can be measured in parallel with transmission of probe waves and the state of the transducer 21 can be determined.

In addition, a linear chirp signal is used, or an amplitude signal is extracted from the waveform of the inter-terminal voltage V for use in state determination, so that a state determination can be made even in an inexpensive on-vehicle IC with an accuracy required for object detection.

Second Embodiment

A second embodiment will be described. The present embodiment is different from the first embodiment in that the reference for state determination has been changed, with other factors remaining unchanged. Therefore, only the points different from the first embodiment will be described.

The state determination unit 27 of the present embodiment converts the amplitude signal to exclude frequency characteristics of the transmitter circuit 22 and the receiver circuit 23, and makes a state determination based on the converted amplitude signal. Specifically, the state determination unit 27 converts the amplitude signal of the inter-terminal voltage V to an impedance of the transducer 21 and makes a state determination based on this impedance. The impedance of the transducer 21 will be represented by Zs.

As will be described later, the present embodiment uses frequency characteristics of the impedance Zs. In this regard, the state determination unit 27 makes a state determination based on the relationship between the probe wave frequency and the amplitude of the inter-terminal voltage V to make the processing easy. Specifically, the state determination unit 27 is ensured to receive input of a transmission signal indicating the relationship between time and the prove wave frequency. Thus, the state determination unit 27 generates a signal indicating the relationship between frequency and amplitude from the transmission signal and the amplitude signal that indicates the relationship between time and the inter-terminal voltage V to calculate the impedance Zs from this signal.

Figure 6:
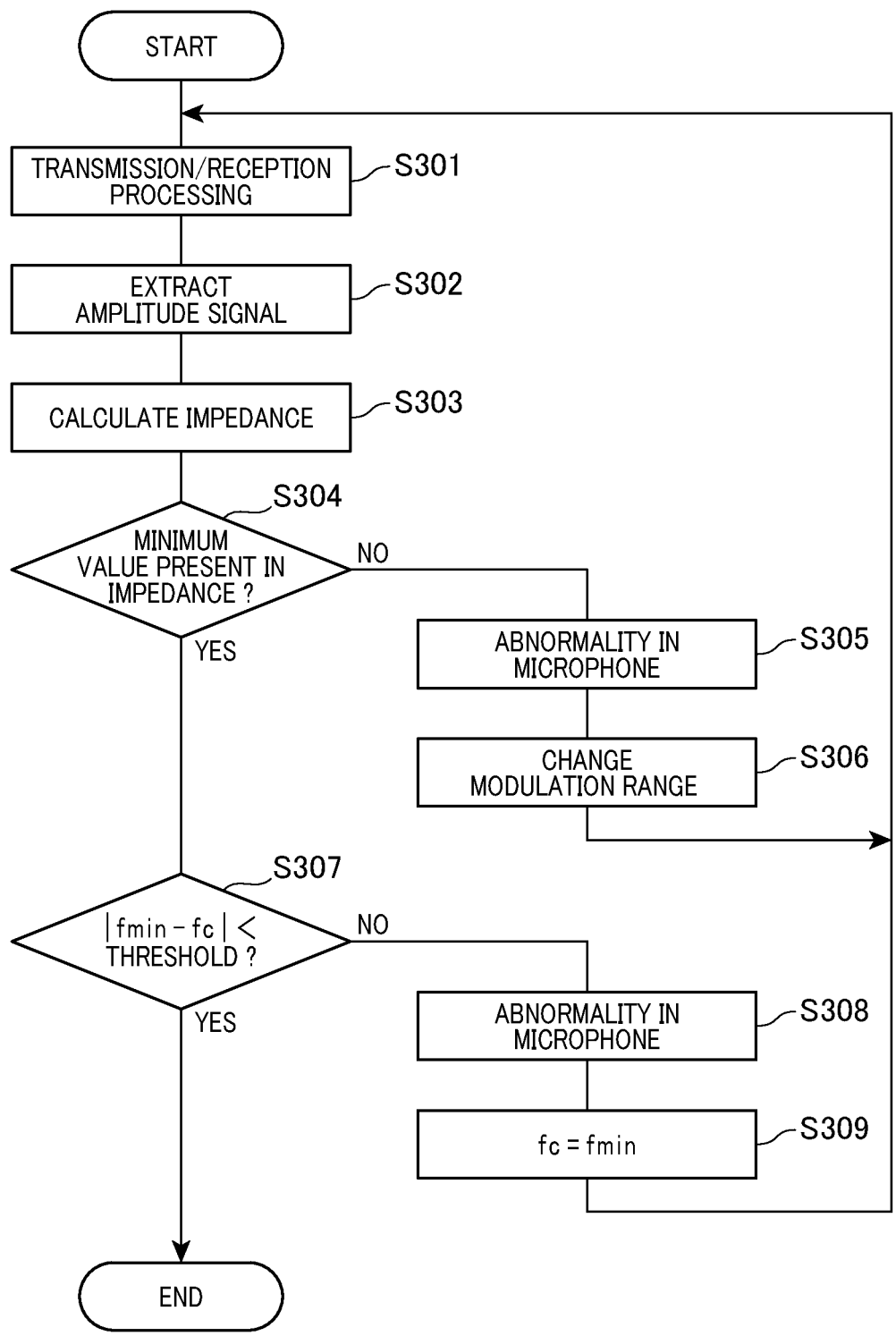
FIG. 6 is a flowchart illustrating state determination processing according to a second embodiment.

The object detection device 1 executes the processing shown in FIG. 6. First, at step S301, the object detection device 1 transmits/receives ultrasonic waves, measures the inter-terminal voltage V, and detects an environmental temperature as in step S101 of FIG. 4. At the subsequent step S302, the voltage measurement unit 26 extracts an amplitude signal from the waveform of the inter-terminal voltage V and outputs the extracted signal to the state determination unit 27.

Subsequently, at step S303, the state determination unit 27 calculates the impedance Zs from the amplitude signal. The impedance Zs, i.e., the impedance of the series resonant circuit RCs, is expressed by the following formula.

$$Z_s = \frac{R2}{\left\{\frac{W}{V^2 + RT \cdot W} - j\omega(C2 + C3)\right\}R2 - 1} \quad [\text{Math. 1}]$$

With this formula, the impedance Zs can be calculated by excluding the effects of the parallel resonant circuit RCp from the combined impedance containing the parallel resonant circuit RCp. Thus, by controlling the current supplied to the primary side of the transformer so that an output power W of the secondary inductance LT of the transformer will be constant or substantially constant, the impedance Zs can be obtained from the inter-terminal voltage V.

The state determination unit 27 converts the amplitude signal into the impedance Zs based on the environmental temperature so that the frequency characteristics of the transmitter circuit 22 and the receiver circuit 23 will be excluded. In other words, when calculating the impedance Zs, the state determination unit 27 corrects the frequency characteristics of the parallel resonant circuit RCp based on the environmental temperature measured at step S301. Using the value corrected in this way, the impedance Zs can be calculated by excluding the effects of the characteristics of the capacitance C2, the capacitor C3, and the inductance LT contained in the amplitude signal. Such temperature compensation can improve the accuracy of the state determination.

At the subsequent step S304, the state determination unit 27 determines whether there is a minimum value in the impedance Zs. If it is determined that there is no minimum value, control proceeds to steps S305 and S306 at which the abnormality flag of the transducer 21 is turned on and the frequency modulation range of probe waves is changed as in steps S104 and S105 of FIG. 4, and then control returns to step S301.

If it is determined that there is a minimum value, control proceeds to steps S307 to S309 at which processing similar to that of steps S106 to S108 of FIG. 4 is executed.

Specifically, if the difference between the frequency fmin and the center frequency fc is not less than the threshold, the abnormality flag of the transducer 21 is turned on to change the frequency modulation range so that fc=fmin, and then control returns to step S301. If the difference between the frequency fmin and the center frequency fc becomes less than the threshold, the object detection device 1 terminates the processing.

In the present embodiment, the frequency when the impedance Zs takes a minimum value is represented by fmin. The frequency fmin is the actual resonant frequency of the transducer 21, and thus when the transducer 21 is in a normal state, fmin=f0 is established and when abnormality occurs in the transducer 21, fmin≠f0 is established.

Thus, if there is no minimum value in the impedance Zs, it is determined that abnormality has occurred in the transducer 21, and the frequency modulation range is changed to search for a frequency fmin. Furthermore, if the difference between the frequency fmin and the center frequency fc is large, it is also determined that abnormality has occurred in the transducer 21. Then, the frequency modulation range is changed so that the value of the center frequency fc will have the value of the frequency fmin, i.e., the value of the actual resonant frequency that is different from the design value of the transducer 21.

The processing described above can achieve a state in which there is a minimum value in the impedance Zs and the difference between the frequency fmin and the center frequency fc is small. After that, the object detection device 1 repeats the processing of determining the state of the transducer 21 and setting a drive frequency according to the state of the transducer 21 as in the first embodiment.

Figure 5:
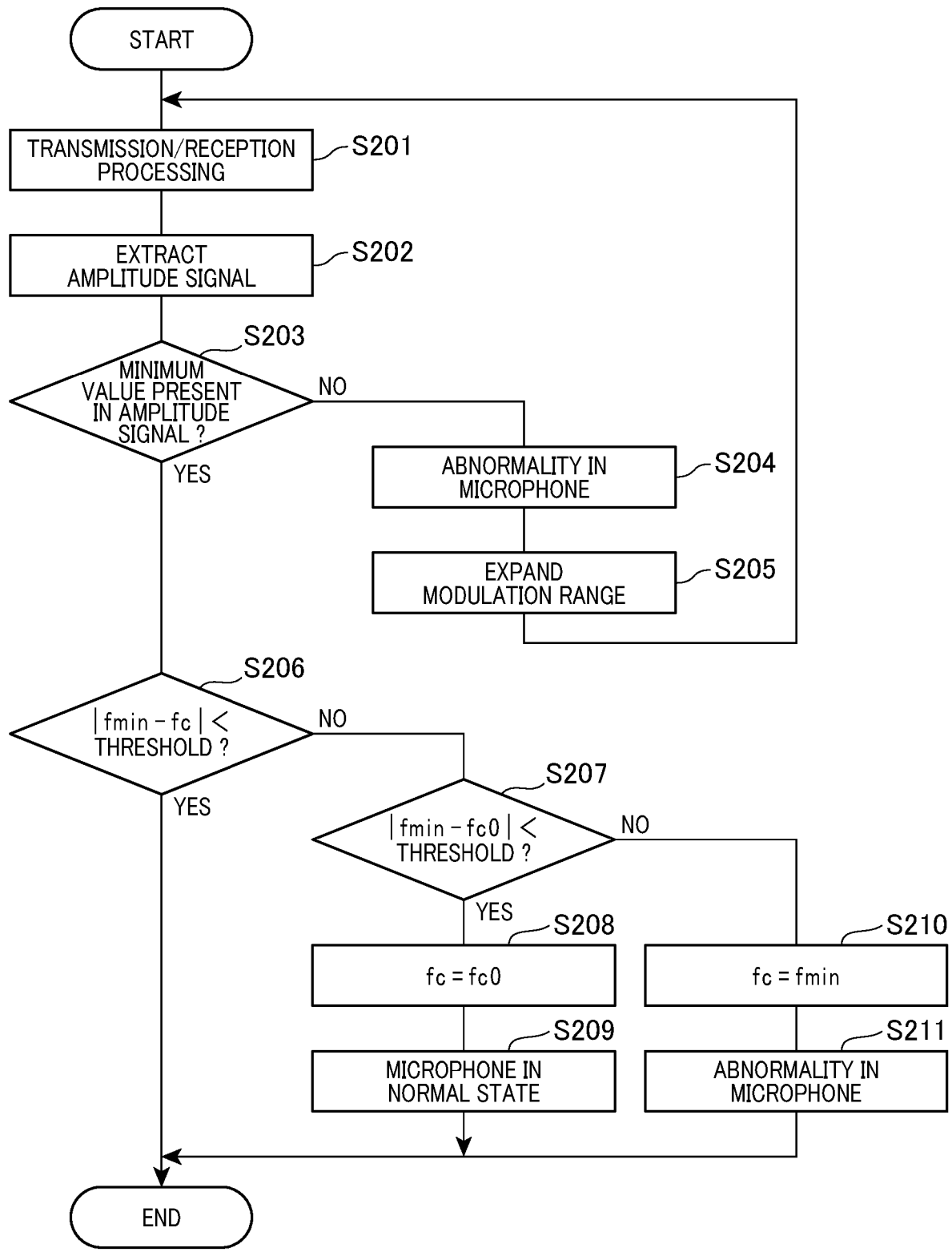
FIG. 5 is a flowchart illustrating state determination processing executed following the processing shown in FIG. 4.

However, in the present embodiment, transmission/reception of probe waves, extraction of an amplitude signal, and calculation of an impedance Zs are performed as in steps S301 to S303, prior to the step corresponding to step S203 of FIG. 5. Then, at the step corresponding to step S203, it is determined whether there is a minimum value in the impedance Zs as in step S304.

If it is determined that there is no minimum value, the processing as in steps S305 and S306 is executed, and if it is determined that there is a minimum value, the frequency fmin is compared with the center frequency fc as in step S307. If it is determined that the difference between the frequency fmin and the center frequency fc is less than the threshold, the object detection device 1 terminates the processing.

If it is determined that the difference between the frequency fmin and the center frequency fc is not less than the threshold, the frequency fmin is compared with the center frequency fc0 of a normal state as in step S207 of FIG. 5. If the frequency difference is determined to be less than the threshold, fc=fc0 is taken to be satisfied, the normality flag of the transducer 21 is turned on, and the object detection device 1 terminates the processing. If the frequency difference is determined to be not less than the threshold, fc=fmin is taken to be satisfied, the abnormality flag of the transducer 21 is turned on, and the object detection device 1 terminates the processing.

When snow, mud, etc. adheres to the transducer 21, the frequency characteristics of the impedance Zs changes and the difference between the frequency fmin and the center frequency fc increases, and therefore, a state determination can be made based on the impedance Zs. In the present embodiment in which a state determination is made for the transducer 21, advantageous effects similar to those of the first embodiment can also be achieved.

Other Embodiments

The present disclosure should not be limited to the embodiments described above, but can be changed as appropriate. As a matter of course, in the above embodiments, the components configuring the embodiments are not necessarily essential except for the case where the components are explicitly expressed as being essential, the case where the components are considered to be clearly essential in principle, and other cases.

For example, in the first embodiment, the state of the transducer 21 is determined based on the comparison between the frequency fmin and the center frequency fc or fc0 as a reference frequency; however, a state determination may be made based on the comparison between the minimum value of the amplitude signal and a predetermined reference amplitude. In this case, the state determination accuracy can also be improved by correcting the reference amplitude based on the environmental temperature. A state determination may be made based on both of the frequency comparison and the amplitude comparison. A state determination may be made based on the waveform in the vicinity of the local minimum point of the amplitude signal.

In the first embodiment, the output power of the inductance LT in the circuit shown in FIG. 2 is taken to be constant or substantially constant; however, a waveform related to the characteristics of the transducer 21 may be permitted to appear in the voltage signal of the transducer 21 using other methods.

In the above embodiments, abnormality such as adhesion of snow to the transducer 21 can be detected; however, other states of the transducer 21 may be detected. The object detection device 1 should not be limited to those which are mounted to vehicles. For example, the object detection device 1 can be mounted to ships of air vehicles.

The functional configurations and methods described above may be implemented by a dedicated computer which is provided by configuring a processor and a memory that are programmed to execute one or more embodied functions. Alternatively, the functional configurations and methods described above may be implemented by a dedicated computer which is provided by configuring a processor with one or more dedicated hardware logic circuits. Alternatively, the functional configurations and methods described above may be implemented by one or more dedicated computers which are configured by combining a processor and a memory that are programmed to perform one or more functions, with a processor that is configured by one or more hardware logic circuits. Furthermore, the computer programs may be stored in a computer readable non-transitory tangible recording medium, as instructions to be executed by the computer.

The invention claimed is:

1. An object detection device comprising:
   a transceiver configured to transmit/receive an ultrasonic wave;
   a drive signal generation unit configured to generate a drive signal for driving the transceiver;
   a transmitter circuit configured to cause the transceiver to transmit a probe wave, which is an ultrasonic wave, by driving the transceiver based on the drive signal; and
   a receiver circuit configured to generate a reception signal corresponding to a reception result of the ultrasonic wave of the transceiver, wherein
   the drive signal generation unit is configured to generate the drive signal so that frequency of the probe wave changes over time,
   the object detection device further comprising:
   a voltage measurement unit configured to measure a voltage signal generated in the transceiver while the transceiver transmits the probe wave with frequency changing over time; and
   a state determination unit configured to make a state determination regarding the transceiver based on the voltage signal, wherein
   the state determination unit is configured to make the state determination based on an amplitude signal extracted from the voltage signal,
   the state determination unit is configured to determine a state of at least one of the transceiver, the transmitter circuit, and the receiver circuit based on information related to a local minimum point of the amplitude signal, and
   the state determination unit is further configured to determine the state of at least one of the transceiver, the transmitter circuit, and the receiver circuit, based on either or both of a comparison between a frequency of the probe wave corresponding to the local minimum point and a reference frequency, and a comparison between a magnitude of the amplitude signal at the local minimum point and a reference amplitude.

2. The object detection device according to claim 1, wherein the state determination unit is configured to make the state determination based on a relationship between frequency of the probe wave and amplitude of the voltage signal.

3. The object detection device according to claim 2, wherein the state determination unit is configured to convert the amplitude signal so as to exclude frequency characteristics of the transmitter circuit and the receiver circuit, and make the state determination based on the converted amplitude signal.

4. The object detection device according to claim 3, wherein the state determination unit is configured to perform the conversion based on an environmental temperature so as to exclude frequency characteristics of the transmitter circuit and the receiver circuit.

5. The object detection device according to claim 1, wherein the state determination unit is configured to determine the state of at least one of the transceiver, the transmitter circuit, and the receiver circuit, based on either or both of a comparison between a frequency of the probe wave and the reference frequency corrected based on an environmental temperature, and a comparison between a magnitude of the amplitude signal and the reference amplitude corrected based on the environmental temperature.

6. The object detection device according to claim 1, wherein a frequency modulation range of the probe wave is changed based on a frequency of the probe wave corresponding to a local minimum point of the amplitude signal.

7. The object detection device according to claim 1, wherein the drive signal generation unit is configured to generate the drive signal so that frequency of the probe wave monotonically increases over time or monotonically decreases over time.

8. The object detection device according to claim 1, wherein the transmitter circuit is configured to control current generated according to the drive signal so as to have a constant electrical power, and supply the current to the transceiver.

9. An object detection device comprising:
   a transceiver configured to transmit/receive an ultrasonic wave;

a drive signal generation unit configured to generate a drive signal for driving the transceiver;

a transmitter circuit configured to cause the transceiver to transmit a probe wave, which is an ultrasonic wave, by driving the transceiver based on the drive signal; and a receiver circuit configured to generate a reception signal corresponding to a reception result of the ultrasonic wave of the transceiver, wherein the drive signal generation unit is configured to generate the drive signal so that frequency of the probe wave changes over time, the object detection device further comprising:

a voltage measurement unit configured to measure a voltage signal generated in the transceiver while the transceiver transmits the probe wave with frequency changing over time; and a state determination unit configured to make a state determination regarding the transceiver based on the voltage signal, wherein the state determination unit is configured to make the state determination based on an amplitude signal extracted from the voltage signal, the state determination unit is further configured to determine a state of at least one of the transceiver, the transmitter circuit, and the receiver circuit based on information related to a local minimum point of the amplitude signal, and when there is no local minimum point in the amplitude signal, either or both of expansion and shifting is performed for a frequency modulation range of the probe wave to transmit the probe wave and search for the local minimum point.

10. The object detection device according to claim 9, wherein the transmitter circuit is configured to control current generated according to the drive signal so as to have a constant electrical power, and supply the current to the transceiver.

11. The object detection device according to claim 9, wherein a frequency modulation range of the probe wave is changed based on a frequency of the probe wave corresponding to a local minimum point of the amplitude signal.

12. The object detection device according to claim 9, wherein the drive signal generation unit is configured to generate the drive signal so that frequency of the probe wave monotonically increases over time or monotonically decreases over time.

* * * * *